United States Patent [19]

Hongou et al.

[11] Patent Number: 4,612,555
[45] Date of Patent: Sep. 16, 1986

[54] LASER BEAM SCANNER APPARATUS

[75] Inventors: Jinichi Hongou; Yoshifumi Homma, both of Hitachi; Shoichi Ito, Ibaraki; Kimio Tatsuno, Kokubunji, all of Japan

[73] Assignee: Hitachi, Ltd., Tokyo, Japan

[21] Appl. No.: 627,891

[22] Filed: Jul. 5, 1984

[30] Foreign Application Priority Data

Jul. 8, 1983 [JP] Japan ................... 58-123374

[51] Int. Cl.⁴ .................. G01D 15/14; G01D 9/42; H04N 1/21
[52] U.S. Cl. .................... 346/160; 346/108; 358/302
[58] Field of Search ............ 346/160, 108, 109, 107; 358/302; 350/6.7, 6.8, 642

[56] References Cited

U.S. PATENT DOCUMENTS

| | | | |
|---|---|---|---|
| 3,787,107 | 1/1974 | Sick et al. ................... | 350/7 |
| 4,214,157 | 7/1980 | Check, Jr. et al. ............ | 358/302 X |
| 4,306,242 | 12/1981 | Jeffery ....................... | 346/108 X |
| 4,384,297 | 5/1983 | Ohara et al. ................. | 346/108 |
| 4,434,431 | 2/1984 | Ohkubo et al. ............... | 346/160 X |
| 4,482,209 | 11/1984 | Grewal et al. ................ | 350/642 |

OTHER PUBLICATIONS

Jenkins et al, *Fundamentals of Optics*, 3rd Edition McGraw-Hill, pp. 520–521, 1957.

*Primary Examiner*—E. A. Goldberg
*Assistant Examiner*—Linda M. Peco
*Attorney, Agent, or Firm*—Antonelli, Terry & Wands

[57] ABSTRACT

In a laser beam scanner apparatus for scanning the surface of a photosensitive drum or a document to be read by deflecting a laser beam emitted from a laser diode with a deflector, there is provided a drive current control circuit for controlling the magnitude of drive current of said laser diode on the basis of a beam deflection angle of said deflector.

23 Claims, 11 Drawing Figures

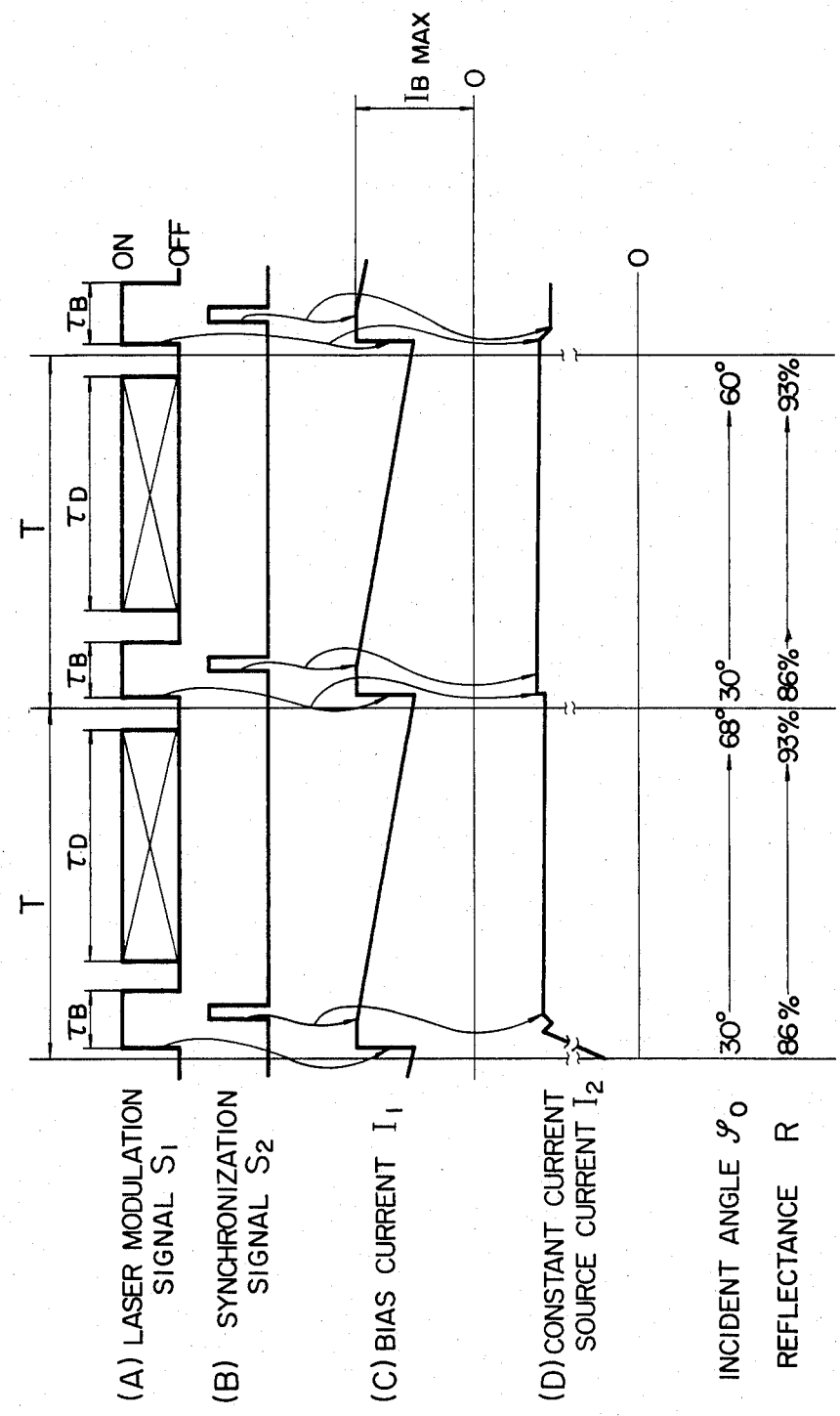

LASER BEAM SCANNER APPARATUS

BACKGROUND OF THE INVENTION

The present invention relates to a laser beam scanner and in particular to a laser beam scanner apparatus used in a laser beam printer or a character reader employing electrophotography.

As disclosed in the U.S. Pat. No. 4,384,297, in a laser beam printer, a laser beam emitted from a semiconductor laser oscillator is shaped by a beam shaping lens, deflected by a deflector, and focused to form a beam spot on a recording medium by a focusing lens. The deflector moves the beam spot in a direction perpendicular to the running direction of the recoding medium and repetitively forms scanning lines. A driving circuit controls the semiconductor laser oscillator on the basis of a video signal to form an image on the recording medium.

When a photosensitive recording medium for electrophotography is used, the recording medium is uniformly electrified by an electrifier and then exposed by scanning of the laser beam to form an electric latent image. This electric latent image is subjected to toner development. The toner image is reproduced and fixed on a recording sheet.

As disclosed in the U.S. Pat. No. 3,787,107, in a character reader, a laser beam emitted from a laser oscillator is deflected by a deflector to scan the document surface. The reflected light is converted into a video signal by a transducer.

Detailed examination of the reproduced image or video signal resulting from such a conventional laser beam printer or character reader indicates that the image is not faithfully drawn or the image has not been faithfully subjected to photo electro conversion. In image recording, fine black lines (hereafter referred to as "black whiskers") appear in the white background or fine white lines (hereafter referred to as "white whiskers") appear in the black background. Additionally, thinner character or thicker character phenomenon may be found. In image reading, the image density on the scanning line does not accurately correspond to the magnitude of the video signal. In addition, these phenomena occur periodically in relation to the deflection angle of the laser beam, i.e., the scanning position of the laser beam spot.

SUMMARY OF THE INVENTION

An object of the present invention is to provide a laser beam scanner apparatus facilitating accurate scanning and deflection of a laser beam.

As further described later, the inventors found that the above described troublesome phenomena are caused by the fact that the intensity of the laser beam arriving at the scanning face varies with the deflection angle since the attenuation of the laser beam varies with the deflection angle. Therefore, a more concrete object of the present invention is to provide a laser beam scanner apparatus in which the intensity of the laser beam arriving at the scanning face is not substantially vary with the deflection angle.

To attain the objects, in accordance with the present invention, the intensity of the generated laser beam is varied in relation to the deflection angle of the laser beam so as to reduce variation in the intensity of the laser beam arriving at the scanning face.

To be more concrete, the magnitude of the drive current of the laser beam generator is controlled according to the deflection angle so as to vary the intensity of the generated laser beam.

The present invention will be apparent from the following detailed description taken in conjunction with the accompanying drawings, in which:

BRIEF DESCRIPTION OF THE DRAWINGS

FIG. 8 is a time chart for the circuit illustrated in FIG. 7.

DESCRIPTION OF THE PREFERRED EMBODIMENTS

Figure 1:
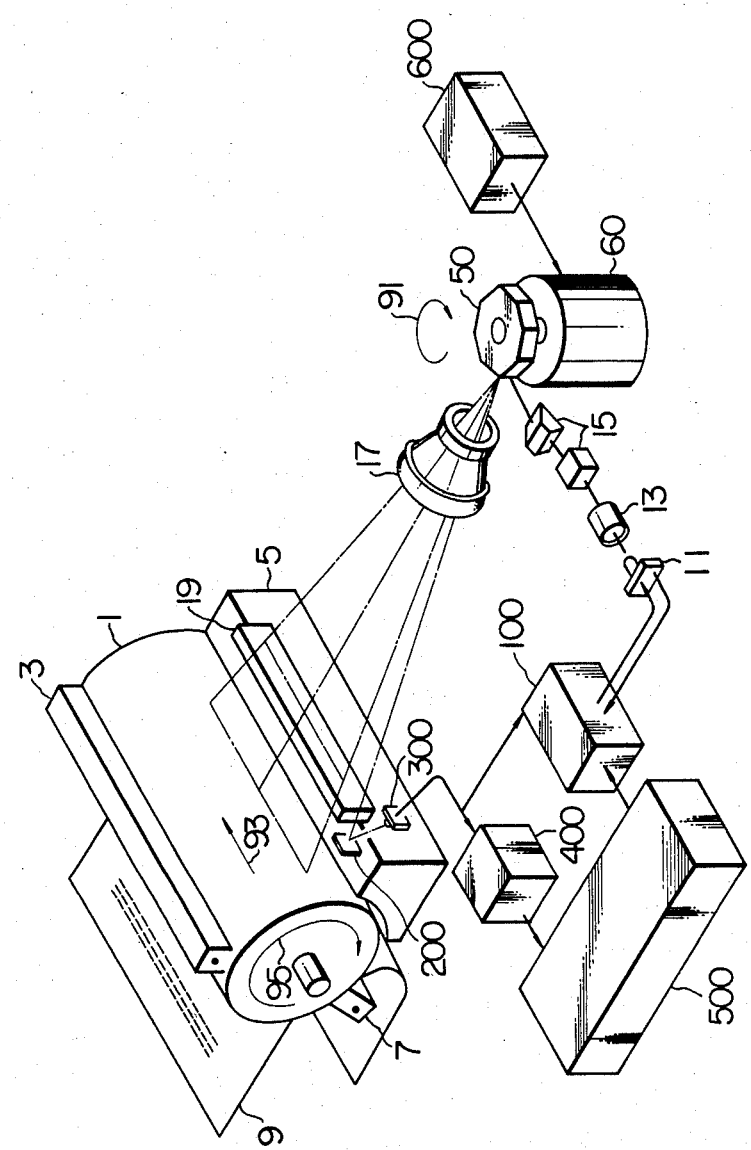
FIG. 1 shows the schematic configuration of a laser beam printer.
Figure 2:
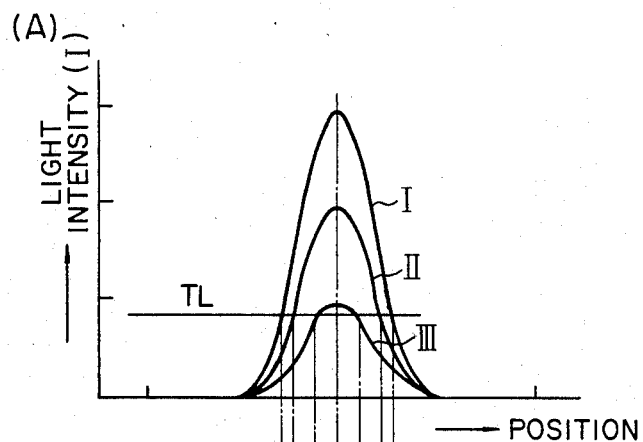
FIG. 2(A) and FIG. 2(B) are characteristic diagrams for illustrating the relation between the laser beam intensity and the effective spot shape.

FIG. 1 is an oblique view for illustrating the schematic configuration of a laser beam printer. At first, the focusing optical system will be described by referring to FIG. 1. Reference numeral 11 denotes a laser diode unit used as a light source. The output intensity of the light emitted from the laser diode unit 11 is controlled by changing the drive current flowing into the laser diode using a modulator 100. The laser light emitted from the laser diode unit 11 is converted into a parallel laser beam by a collimator lens 13 and shaped so as to have a predetermined cross-sectional shape by a light shaper group 15.

The laser beam thus shaped is deflected by a rotary polyhedral mirror 50. Although the rotary polyhedral mirror is used as the reflector in this emobidment, a galvanometer mirror may also be used.

The laser beam is incident on an F-θ lens 17 stopped down and subjected to compensation for the image shift in a cylindrical lens 19. As a result, a small laser beam spot is formed on a photosensitive drum 1. The image shift refers to the fact that the scanning line on the photosensitive drum is deviated in the rotation direction of the photosensitive drum 1 depending upon the reflector surface being used because of non-parallelism of the reflector surfaces of the rotary polyhedral mirror 50 with regard to its axis of rotation. Even if the incident laser beam is deviated from its normal direction in the rotation direction of the photosensitive drum 1, the cylindrical lens 19 deflects the laser beam to the focus of that lens to compensate the deviation. As the rotary polyhedral mirror 50 is rotated in a direction indicated by an arrow 91 by a scanner motor 60, the deflection angle of the laser beam is varied. The laser beam spot moves on the photosensitive drum 1 in a direction indicated by an arrow 93.

As the visible image recording system, the following components are disposed. Around the photosensitive drum 1 rotating in the direction indicated by an arrow 95, components required for the electrophotography process, such as an electrifier 3, development device 5, and a transfer device 7 are disposed. Thus, as a result of processes composed of electrification, exposure (formation of electrostatic latent image), development (visualization of the latent image by using the toner), and transfer, a visual image is recorded on a recording sheet 9.

The effective spot size refers to the size of a part, which can excite the photosensitive drum, of the laser beam spot formed on the surface of the photosensitive drum by the laser beam in the laser beam printer. The relation between the effective spot size and printing quality will now be described by referring to FIGS. 2(A), 2(B), and 3A to 3C.

FIG. 2(A) shows the light intensity distribution in the laser beam spot focused on the scanned surface of the photosensitive drum 1. Usually, the distribution of light quantity follows A Gaussian distribution. Since the laser beam spot size is held constant, the light quantity distribution varies in proportion to the total light quantity of the laser beam. In FIG. 2(A), curves I, II and III correspond to a strong light intensity, medium light intensity, and weak light intensity, respectively. A line TL represents the photosensitive level of a photosensitive substance.

FIG. 2(B) shows effective spot sizes exciting the photosensitive substance. Circles A-1, A-2 and A-3 represent effective spot sizes when the light intensities are strong, medium and weak, respectively.

As evident from FIGS. 2(A) and 2(B), if the photosensitive level TL of the photosensitive substance is constant, spot sizes effective for printing varies in proportion to the light intensity as shown in FIG 2(B).

Assuming that the light intensity is I and the effective spot size is d, a change $\Delta d$ in the effective spot size is roughly related to a change $\Delta I$ in the light intensity by $\Delta d \propto \sqrt{\Delta I}$. When the light intensity changes by 9%, therefore, the spot size effective for printing changes by 3%.

The effective spot size suitable to printing using the scanning optical system will now be described by referring to FIGS. 3A to 3C. The first scanning is represented by $S_1$. The scanning lines formed by the first scanning are represented by a-$S_1$, b-$S_1$ and c-$S_1$ in FIGS. 3A, 3B and 3C, respectively. Similarly, the second, third, and fourth scans are represented by $S_2$, $S_3$, and $S_4$ and scanning lines formed by these scans are represented by a-$S_2$ to c-$S_2$, a-$S_3$ to c-$S_3$, and a-$S_4$ to c-$S_4$.

In case of electrophotography using the normal development scheme, a part whereto the light is applied on the photosenstive drum ("ON" area) becomes white and the remaining part whereto the light is not applied ("OFF" area) becomes black.

Figure 3A:
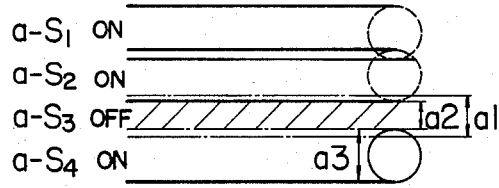
FIGS. 3A to 3C are characterisitc diagrams for illustrating the relation between the effective spot shape and recorded image.

For the "strong" light intensity, the effective spot size (a3) becomes larger than the scanning line pitch (a1) and the width (a2) of the black line part represented by a shaded region is decreased since a2=2a1−a3 as illustrated in FIG. 3A. This results in the thinner character phenomenon.

Figure 3B:
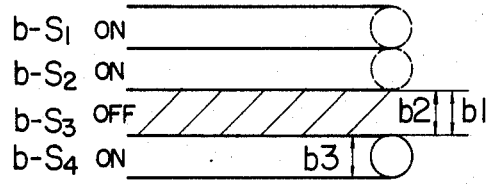
Figure 3C:
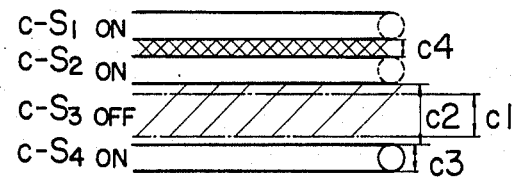

When the light intensity is "medium", that is to say, the light intensity is moderate, the effective spot size (b3) becomes equal to the scanning line pitch (b1) as illustrated in FIG. 3B. Accordingly, neither the thinner character phenomenon, nor the thicker character phenomenon described later, nor whiskers occur.

When the light intensity is "weak", the effective spot size (c3) becomes smaller than the scanning line pitch (c1). As a result, the width (c2) of the black line part represented by a shaded region is increased since c2=2c1−c3, or black whiskers (c4=c2−c1) occur between successive scanning lines as illustrated in FIG. 3C.

In this way, a change in effective spot size due to a change in light intensity brings about thinner characters, thicker characters, or whiskers, deteriorating printing quality.

In case of a readout apparatus, such a phenomenon causes excessive readout due to a partially overlapped readout scanning areas or insufficient readout due to a gap occurring in the readout area. Accordingly, a letter or drawing cannot be correctly read out.

When the laser beam is deflected by the rotary polyhedral mirror 50 in the laser beam printer illustrated in FIG. 1, the attenuation of the laser beam varies with the deflection angle. If the intensity of the laser beam emanating from the laser diode unit 11 is held constant, therefore, the intensity of the laser beam arriving at the surface of the photosensitive drum 1 varies with the deflection angle, and the above described drawback occurs. Therefore, the modulator 100, which will be further described later, controls the laser diode unit so that the intensity of the laser beam arriving at the surface of the photosensitive drum 1 will always be constant and hence the surface of the photosensitive drum 1 will be exposed as illustrated in FIG. 3B.

As the control system for synchronizing the rotary polyhedral mirror 50 with the modulator 100, a beam position detecting reflector 200, an optical detector 300, a synchronization signal generator 400, a printing signal controller 500, and a scanner motor controller 600 are disposed. The scanner motor 60 is rotated at a constant speed by the scanner motor controller 600 to repetitively deflect the laser beam. When the laser beam reaches the deflection start reference position, the reflector 200 reflects the laser beam toward the optical detector 300. When the laser beam is applied to the optical detector 300, the synchronization signal generator 400 generates the synchronization signal. Based on the synchronization signal, the printing signal controller 500 supplies a record information signal to the modulator 100.

Figure 4A:
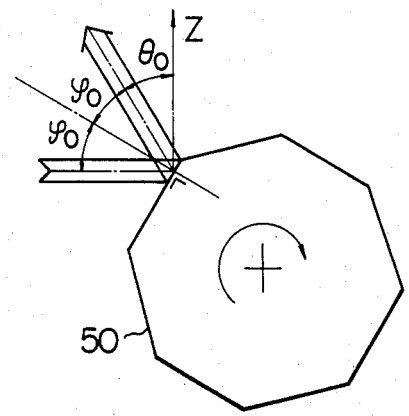
FIGS. 4A and 4B are drawings for illustrating the deflection of the laser beam by a rotary polyhedral mirror.
Figure 4B:
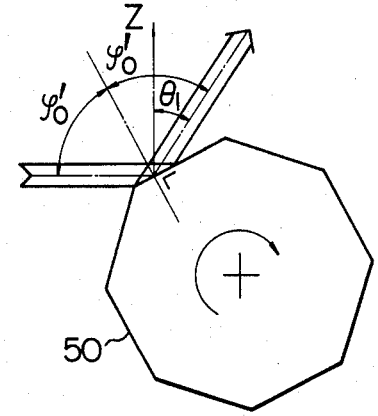

Deflection and scanning operation in recording one scanning line with the laser beam spot by rotating the rotary polyhedral mirror 50 will now be described by referring to FIGS. 4A and 4B. FIG. 4A shows the state of laser beam deflection performed by the rotary polyhedral mirror 50 when the laser beam is at the scanning start position. FIG. 4B shows the state of laser beam deflection performed by the rotary polyhederal mirror 50 when the laser beam is at the scanning end position.

When the laser beam is deflected and scanned by the rotary polyhedral mirror 50 so that one surface will correspond to one scanning line, the deflection scanning angle varies in the range from $\theta_0$ to $\theta_1$ with respect to the center axis Z of the deflection scanning. In that case, the incident angle of the laser beam onto the rotary polyhedral mirror 50 varies from $\phi_0$ to $\phi_0'$ with respect to a plane perpendicular to the reflection surface. Assuming that the rotary polyhedral mirror 50 is an octahedron and the diameter of the inscribed circle and the diameter of the incident laser beam are respectively 60 mm and 5 mm, angles are approximated as $\theta_0 = \theta_1 \approx 30°$, $\phi_0 = 30°$, and $\phi_0'32\ 60°$. That is to say, the incident angle of the laser beam onto the rotary polyhedral mirror 50 varies continuously from 30° to 60°.

The reflectance of the rotary polyhedral mirror 50 varies with the incident angle of the laser beam onto the reflector surface. That is to say, the reflectance varies with the scanning position. Accordingly, the light intensity as described in FIG. 2(A) to FIG. 3C varies and the effective spot size varies accordingly, deteriorating the printing quality.

Figure 5:
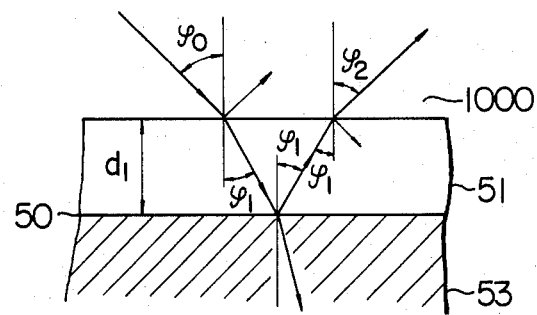
FIG. 5 is a drawing for illustrating the reflection status of a laser beam at the rotary polyhedral mirror.

The change of reflectance will now be described by referring to FIG. 5 and FIG. 6. The rotary polyhedral mirror 50 is formed by making a base material 53 itself reflective or placing a reflective material on the base material, and then covering the reflective material with a protective film 51. In this embodiment, a reflector surface is made of an Al base material, and $S_iO_2$ is used as the guard film to provide a rotary polyhedral mirror 50. FIG. 5 is an enlarged view of the base material 53 and the guard film 51 used to analyze the reflectance for the laser beam.

A laser beam applied from the air to a boundary surface between the air 1,000 and the guard film 51 at an incident angle $\phi_0$ is refracted to have an angle $\phi_1$. However, the laser beam is not entirely refracted, but partially reflected at the boundary surface. Thereby the light intensity of the laser beam is lowered. The reflectance at the boundary surface varies with the incident angle $\phi_0$. The laser beam applied from the guard film 51 onto the boundary surface between the guard film 51 and the base material 53 at an incident angle $\phi_1$ is reflected at a reflection angle $\phi_1$. However, the laser beam is not entirely reflected. A part of the laser beam passes into the base material 53 through the boundary surface. Thereby, the light intensity of the laser beam is further lowered. The reflectance at the boundary surface also varies with the incident angle.

The laser beam applied from the guard film 51 onto the boundary surface between the guard film 51 and the air 1,000 at an incident angle $\phi_1$ is refracted to have a refraction angle $\phi_2$. The laser beam is partially reflected at this boundary surface as well. Accordingly, the light intensity of the laser beam is further lowered. This reflectance also varies with the incident angle.

As described above, the reflectance of the laser beam at the rotary polyhedral mirror 50 varies with the incident angle. Assuming that refractive indexes of the guard film 51 and the base material are respectively $n_1$ and $n_2$ and the thickness of the guard film 51 is $d_1$, the reflectance R of the rotary polyhedral mirror is represented as $R=f(n_1, n_2, \phi_0, d_1)$. Since the refractive indexes $n_1$ and $n_2$ are determined by the employed material, the reflectance R is represented as a function of the incident angle $\phi_0$ and the thickness $d_1$ of the guard film as illustrated in FIG. 6.

Figure 6:
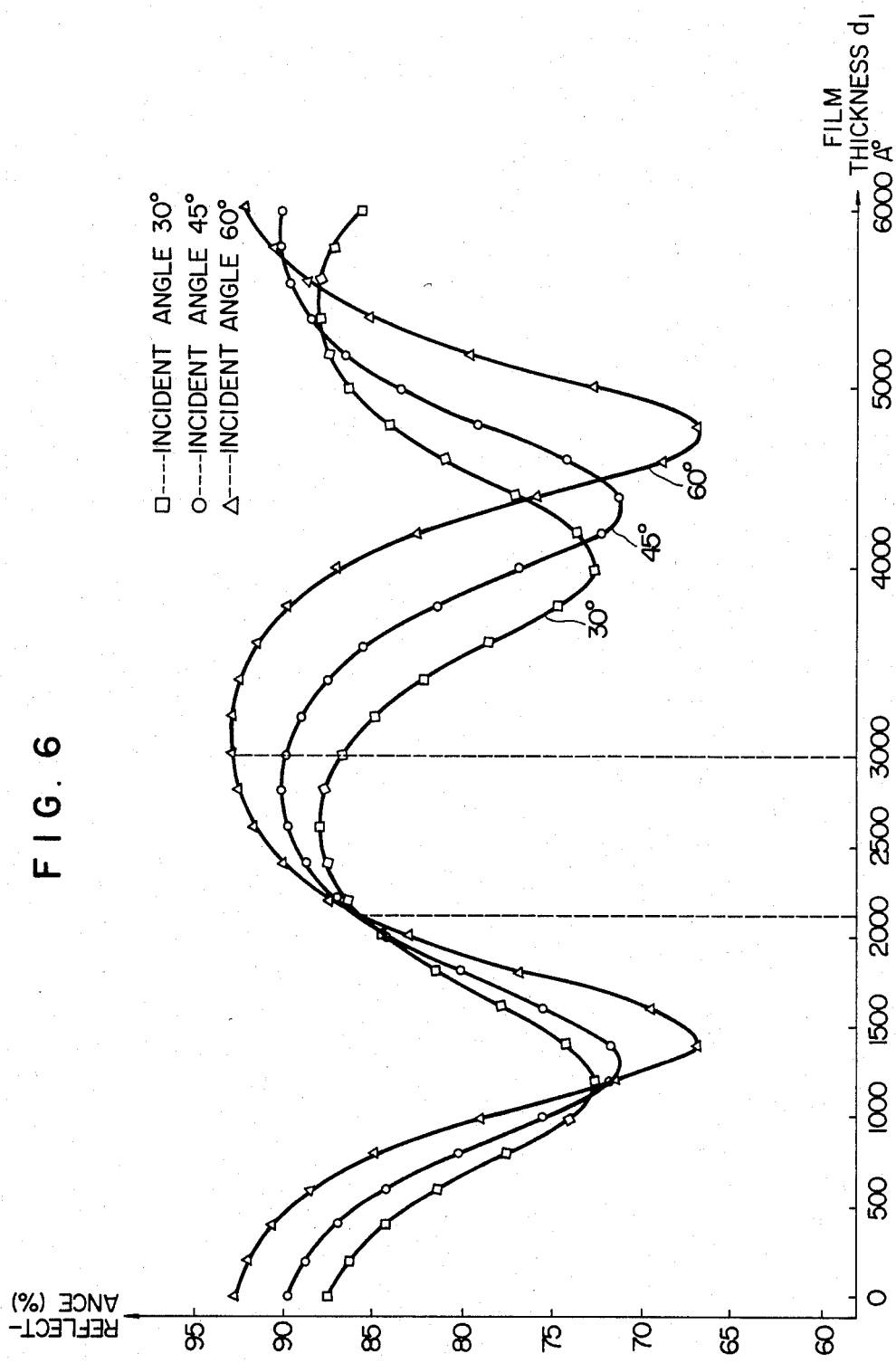
FIG. 6 shows the reflectance characteristics of the rotary polyhedral mirror.

FIG. 6 shows the reflectance for an incident angle of 30°, 45°, or 60° under the condition that the material of the guard film is $S_iO_2$ having a refractive index of 1.46 and a transmittance of 1.0, the base material is Al having a refractive index of 1.08−i5.08, and the laser wavelength $\lambda$ is 7,800 Å.

As evident from FIG. 6, (1) the reflectance R assumes the maximum value near $n_1 d_1 = \lambda/2$, where the change in reflectance R with $\phi_0$ also assmes the maximum value, and (2) the change in reflectance R with $\phi_0$ assumes the minimum value near $d_1=2,100$ Å, where the change in reflectance R with $d_1$ is considerably large.

Therefore, it is possible to minimize the change in effective spot size caused by the change in reflectance with the incident angle and maintain printing quality by choosing the film thickness as $d_1=2,100$ Å.

However, this choice results in problems that the reflectance R of the rotary polyhedral mirror 50 does not assume the maximum value there and varies largely with thickness $d_1$ of the guard film which is apt to be uneven due to error in production.

If there exists a point (1) where the reflectance of the rotary polyhedral mirror 50 is high, (2) where a change in reflectance of the rotary polyhedral mirror 50 with the thickness $d_1$ of the guard film is small, and (3) where a change in reflectance of the rotary polyhedral mirror 50 with the incident angle of the laser beam is small, it is possible to obtain an effective spot size which is even at respective positions in the scanning direction irrespective of the incident angle, and it is also possible to provide an optical scanner apparatus having a rotary polyhedral mirror 50 of high reflectance.

The film thickness $d_1$ of 2,100 Å yields a comparatively high reflectance and a minimum change in reflectance with the incident angle. As described above, however, a change in reflectance of the rotary polyhedral mirror 50 with the film thickness is too large. Therefore, it is not desirable to adopt this film thickness since the error in forming the guard film causes an excessive effect.

In the present embodiment, therefore, a film thickness near the first maximum point is chosen, whereat the value of the reflectance R of the rotary polyhedral mirror 50 is high and stable even if the error in thickness occur when the guard film is formed. In this embodiment, a film thickness near 3,000 Å is chosen. There are several other maximum points. In the region where the film thickness exceeds half of the laser wavelength $\lambda$, however, it is difficult to find a maximum point whereto the reflectance characteristics of respective incident angles converge. Since the transmittance of the guard film 51 made of $S_iO_2$ is not actually 1.0, the laser beam is attenuated while being passed through the guard film 51. Accordingly, the reflectance is considered to be gradually lowered as the film thickness $d_1$ is increased. For these reasons, the film thickness $d_1$ is desired to be around 3,000 Å which is the first maximum point.

In order to compensate a change in attenuation of light intensity of the laser beam caused by a change in reflectance R of the rotary polyhedral mirror 50 with incident angle $\phi_0$ of the laser beam, the drive current flowing into the semiconductor laser diode, i.e., the optical output is controlled and compensated by the modulator 100.

Figure 7:
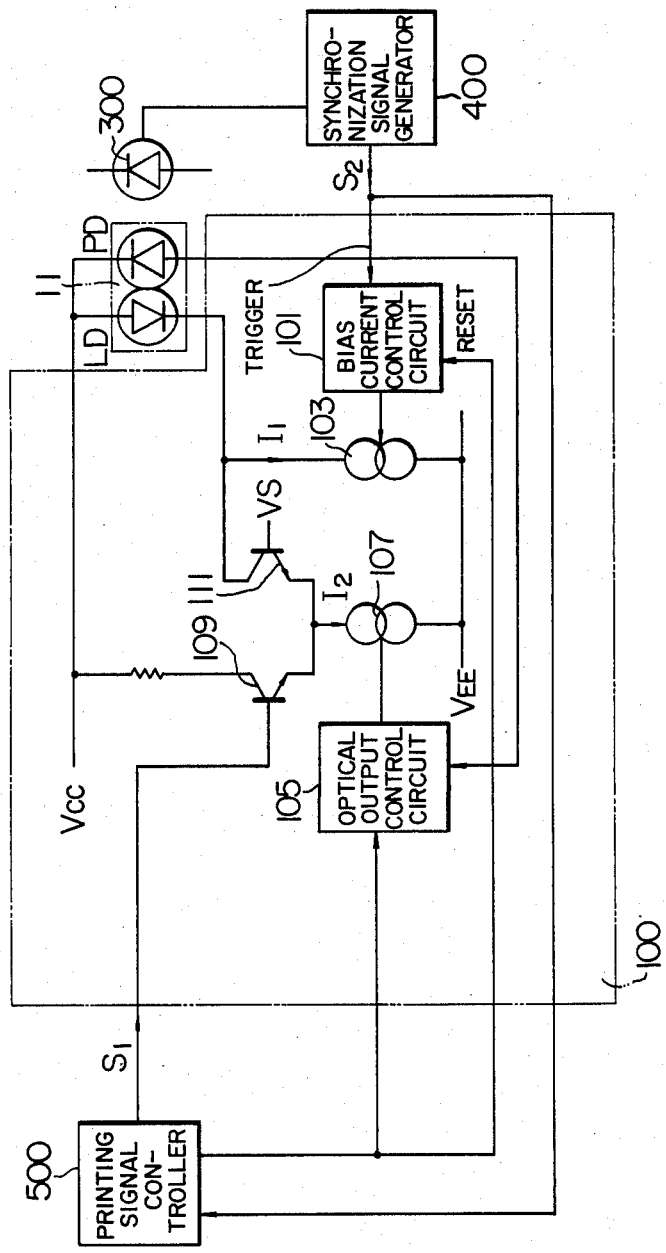
FIG. 7 is a circuit diagram of a circuit for controlling the laser diode drive current.

The configuration and operation characteristics of the modulator 100 will now be decribed by referring to FIG. 7 and FIG. 8.

FIG. 7 is a block diagram of the modulator 100. FIG. 8 illustrates signals related to modulation.

A bias current control circuit 101 controls the current capacity of a bias current source 103 so that a bias current $I_1$ will assume a proper value. The bias current $I_1$ for a semiconductor laser diode LD is so controlled as to compensate a change in effective spot size on the photosensitive drum due to a change in incident angle of the laser beam onto the rotary polyhedral mirror 50.

An optical output control circuit 105 detects the quantity of light emitted from the semiconductor laser diode LD after being subjected to photo electo conversion by a photo detector PD. On the basis of the quantity of light thus detected, the optical output control circuit 105 functions to control a current $I_2$ of a constant current source 107 so as to hold the optical output of the radiant semiconductor laser diode LD constant.

Switching transistors 109 and 111 are provided to apply pulse modulation to the drive current of the semiconductor laser diode LD in accordance with a record information signal. These transistors turn ON and OFF in the differential manner. When the transistor 109 is ON, the transistor 111 is OFF. At a position where toner is to be attached, the record information signal turns off the transistor 111 to stop radiation of the semiconductor laser diode LD. At a position where toner is not to be attached, the switching transistor 111 turns ON. At this time, the current $I_2$ flowing through the switching transistor 111 has a value set in the constant current source 107 by the optical output control circuit 105.

Thus, the drive current composed of $I_1$ and $I_2$ superimposed upon each other flows through the semiconductor laser diode LD. As a result, the light emission of the semiconductor laser diode LD is subjected to pulse modulation and intensity compensation control.

In the above described circuit for controlling the drive current, the currents $I_1$ and $I_2$ can be independently controlled by the bias current control circuit 101 and the optical output control circuit 105 respectively as described below.

Although the radiant intensity of the semiconductor laser diode LD is in proportion to its drive current, it does not emit light for a current less than a particular drive current (threshold current). The threshold current of the semiconductor laser diode LD is in the range of 40 to 100 mA. If the maximum value of the bias current $I_1$ is set as $I_{Bmax} \approx 10$ mA, optical output compensation not less than 30% can be obtained in the range. Even if the drive current is composed of the bias current $I_1$ and the pulse modulation current $I_2$ being let flow independently, the bias current $I_1$ does not affect the pulse modulation of the optical output since the bias current $I_1$ is less than the threshold current. As the drive current control for compensating the optical output of the semiconductor laser diode, the bias current $I_1$ and the pulse modulation current $I_2$ can be independently controlled.

As illustrated in FIG. 8, one scanning period is T. During the scanning period T, the laser beam reflectance of the rotary polyhedral mirror 50 varies from 86% to 93%.

In order to set the bias current $I_1$ for driving the semiconductor laser diode LD to a proper value, the bias current source 103 is connected to the output circuit of the bias current control circuit 101.

A presettable up/down counter and a D/A converter are included in the bias current control circuit 101. The up/down counter is reset by a reset signal fed from the printing signal controller 500 so that the bias current $I_1$ will have a reference value. Assuming that the duration of laser lighting period used for beam position detection within duration of the laser modulation signal $S_1$ is $\tau_B$, the above described reset signal is supplied to the up/down counter simultaneously with the beginning of the period $\tau_B$. The bias current $I_1$ is held at the reference value until a synchronization signal $S_2$ is supplied to the up/down counter. Concurrently with application of the synchronization signal $S_2$, the up/down counter begins substraction in the down mode. The value of the up/down counter is converted by the D/A converter into an analog quantity for controlling the current capacity of the bias current source 103 and hence controlling the bias current $I_1$. In the present embodiment, the bias current $I_1$ is controlled in accordance with the triangularly approximated change in the effective spot size of the reflected beam as illustrated in FIG. 8. A higher accuracy, if required, is attained by controlling the bias current $I_1$ in accordance with more close approximation of the change in the effective spot size of the reflected beam.

The optical output control circuit 105 contains a comparator, an up/down counter, an amplifier, and a D/A converter. The optical output of the semiconductor laser diode LD is detected by the photo diode PD, amplified by the amplifier, and compared with a reference value in the comparator. If the resultant optical output is insufficient, the contents of the up/down counter are increased in the up mode. If the resultant optical output is excessively large, the contents of the up/down counter are decreased in the down mode. The value of the counter is converted by a D/A converter into an analog quantity to control the current capacity of the constant current source 107 and hence the current $I_2$ of the constant current source. Such control is started concurrently with the laser lighting period $\tau_B$ for beam position detection. Simultaneously with application of the synchronization signal $S_2$ from the synchronization signal generator 400, contents of the up/down counter at that time is held thereafter.

The synchronization signal generator 400 receives a signal fed from the photo detector 300, and supplies the synchronization signal $S_2$ to the bias current control circuit 101 and the printing signal controller 500.

By effecting time management on the basis of the synchronization signal $S_2$ fed from the synchronization signal generator 400, the printing signal controller 500 supplies the laser modulation signal $S_1$ to the switching transistor 109 during a recording period $\tau_D$. Concurrently with the start of the period $\tau_B$, the printing signal controller 500 supplies the above described reset signal to the bias current control circuit 101.

The operation of the present embodiment as a whole will now be described. Concurrently with the start of the laser lighting period $\tau_B$ for beam position detection, the bias current $I_1$ is set to the maximum value. Under such a state, the constant current source 107 is controlled by a feedback signal supplied through the photo diode PD and the optical output control circuit 105 so that the optical output of the semiconductor laser diode LD will have a predetermined value.

When the laser beam is applied to the photodetector 300, the synchronization signal $S_2$ is generated. Thereby, the current $I_2$ determined by the feedback control of the constant current source 107 is held to the value at that instant. At that time, the incident angle $\phi_0$ of the laser beam onto the rotary polyhedral mirror 50 is 30°, and the reflectance R is 86%. At the same time, the counter in the optical output control circuit 105 starts a down count operation. Accordingly, the bias current $I_1$ is gradually decreased to lower the optical output of the semiconductor laser diode LD. On the other hand, the incident angle $\phi_0$ of the laser beam onto the rotary polyhedral mirror 50 is increased to increase the reflectance R. Therefore, the light intensity of the laser beam reflected from the rotary polyhedral mirror 50 remains unchanged. As a result, the effective spot size of the laser beam spot formed on the surface of the photosensitive drum 1 does not change irrespective of the scanning position.

During the period $\tau_D$, the current $I_2$ which becomes the drive current of the semiconductor laser diode LD is turned on or off by the switching transistor 111 in accordance with the information record signal. The bias current $I_1$ which flows as the drive current while the transistor 111 is OFF does not affect turning on or off of the optical output for image recording because the bias current is less than the threshold current as described before.

As heretofore described, it is in the present embodiment possible to conduct scanning and exposure with a uniform effective spot size irrespective of the scanning position, printing quality being improved. In addition, the control circuit for controlling the driving current of the semiconductor laser diode is divided into the bias current control circuit for letting flow the bias current for radiant intensity compensation and the optical output control circuit for letting flow the printing signal current and the bias current control circuit and the optical output control circuit can control respective currents independently. Therefore, the bias current and the printing signal current can be freely controlled without affecting each other.

Further, since the rotary polyhedral mirror 50 can be used in an area having the highest reflectance, decrease in laser beam light quantity is slight and the load of the semiconductor laser diode is reduced.

Further, in the vicinity of the guard film thickness whereat the maximum reflectance of the rotary polyhedral mirror 50 is obtained, a change in reflectance with the guard film thickness is small, facilitating quality control in polyhedral mirror production.

In this embodiment, a change in reflectance of the laser beam is compensated by using a bias current having a triangular waveform for approximation. When higher precision is required, improved printing quality can be obtained by using more accurately approximated bias current waveform.

Although the above described embodiment pertains to a scanning type recording apparatus, a light beam scanning apparatus according to the present invention can also be applied to a scanning type image readout apparatus.

We claim:

1. A laser beam scanner apparatus comprising:
   a laser light source;
   a deflector for deflecting a laser beam output from said laser light source;
   an imaging optical system for forming a laser beam spot on a scanning surface; and
   a current control circuit for controlling a drive current fed to said laser light source to control the light output, said current control circuit comprising a drive current control circuit, said drive current control circuit controlling, on the basis of the incident angle of the laser beam with respect to said deflector, the drive current fed to said laser light source in order to compensate the light quantity of the deflected beam which varies with a change in incident angle of the laser beam with respect to said deflector.

2. A laser beam scanner apparatus according to claim 1, wherein said deflector includes:
   a reflective material; and
   a guard film, said guard film being formed on said reflective material, said guard film having such a thickness that the reflectance is close to the maximum value.

3. A laser beam scanner apparatus according to claim 1, wherein said drive current control circuit includes:
   a bias current control circuit for letting flow a bias current through said laser light source in order to compensate a change in light quantity of the deflected beam; and
   a printing current control circuit for letting flow a printing signal current through said laser light source independently of said bias current control circuit.

4. A laser beam scanner apparatus according to claim 3, wherein said bias current control circuit compensates a change in light quantity of the reflected beam by letting flow the bias current which has a triangular waveform for the purpose of approximation.

5. A laser beam scanner apparatus according to claim 4, wherein said deflector comprises a rotary polyhedral mirror.

6. A laser beam scanner apparatus according to claim 5, wherein said scanning surface is a surface of a photosensitive material, and said bias current control circuit generates a bias current for compensating for variation of the intensity of the laser beam so that an effective spot size having a light intensity above a photosensitive level of said photosensitive material among laser beam spots formed on said surface of a photosensitive material does not change by a change in an incident angle of the laser beam with respect to a reflection surface of said rotary polyhedral mirror.

7. A laser beam scanner apparatus according to claim 3, wherein said deflector comprises a rotary polyhedral mirror.

8. A laser beam scanner apparatus according to claim 7, wherein said scanning surface is a surface of a photosensitive material, and said bias current control circuit generates a bias current for compensating for variation of the intensity of the laser beam so that an effective spot size having a light intensity above a photosensitive level of said photosensitive material among laser beam spots formed on said surface of a photosensitive material does not change in an incident angle of the laser beam with respect to a reflection surface of said rotary polyhedral mirror.

9. A laser beam scanner apparatus according to claim 1, wherein said deflector comprises a rotary polyhedral mirror.

10. A laser beam scanner apparatus according to claim 9, wherein said scanning surface is a surface of a photosensitive material, and said drive current control circuit generates a current for compensating for variation of the intensity of the laser beam so that an effective spot size having a light intensity above a photosensitive level of said photosensitive material among laser beam spots formed on said surface of a photosensitive material does not change by a change in an incident angle of the laser beam with respect to a reflection surface of said rotary polyhedral mirror.

11. A laser beam scanner apparatus according to claim 1, wherein said drive current control circuit controls the drive current so that the laser beam spot size on the scanning surface is substantially constant during the scanning on the scanning surface independently of the change in incident angle of the laser beam with respect to said deflector for scanning of the scanning surface.

12. A laser beam scanner apparatus comprising:
    a laser diode unit having a laser diode;

a deflector for deflecting a laser beam emitted from said laser diode;

an imaging optical system for forming a laser beam spot on a scanning surface; and a current control circuit for controlling the magnitude of a drive current fed to said laser diode to control generation of the laser beam, said current control circuit having a drive current control circuit, said drive current control circuit changing, on the basis of the laser beam deflection amount of said deflector, the magnitude of the drive current being let flow through said laser diode for emitting the laser beam.

13. A laser beam scanner apparatus according to claim 12, wherein said drive current control circuit includes:

a bias current control circuit for letting flow a bias current through said laser diode in order to compensate attenuation of the laser beam occurring in said deflector; and a printing current control circuit for letting flow a printing signal current in accordance with a printing image through said laser diode.

14. A laser beam scanner apparatus according to claim 13, wherein a parallel circuit composed of said bias current control circuit and said printing current control circuit is connected in series with said laser diode.

15. A laser beam scanner apparatus according to claim 14, wherein said printing current control circuit includes:

a switching transistor circuit for responding to a printing signal;

a constant current circuit connected in series with said switching transistor circuit; and an output control circuit for controlling the magnitude of the current flowing through said constant current circuit.

16. A laser beam scanner apparatus according to claim 15, wherein said laser diode unit includes a photo diode for generating an electric signal depending upon the intensity of the laser beam emitted from said laser diode, and said output control circuit alters the magnitude of the current flowing through said constant current circuit depending upon said electric signal output from said photo diode.

17. A laser beam scanner apparatus according to claim 13, wherein said printing current control circuit includes:

a switching transistor circuit for responding to a printing signal;

a constant current circuit connected in series with said switching transistor circuit; and an output control circuit for controlling the magnitude of the current flowing through said constant current circuit.

18. A laser beam scanner apparatus according to claim 17, wherein said laser diode unit includes a photo diode for generating an electric signal depending upon the intensity of the laser beam emitted from said laser diode, and said output control circuit alters the magnitude of the current flowing through said constant current circuit depending upon said electric signal output from said photo diode.

19. A laser beam scanner apparatus according to claim 13, wherein said deflector comprises a rotary polyhedral mirror.

20. A laser beam scanner apparatus according to claim 19, wherein said scanning surface is a surface of a photosensitive material, and said bias current control circuit generates a bias current for compensating for variation of the intensity of the laser beam so that an effective spot size having a light intensity above a photosensitive level of said photosensitive material among laser beam spots formed on said surface of a photosensitive material does not change by a change in an incident angle of the laser beam with respect to a reflection surface of said rotary polyhedral mirror.

21. A laser beam scanner apparatus according to claim 12, wherein said deflector comprises a rotary polyhedral mirror.

22. A laser beam scanner apparatus according to claim 21, wherein said scanning surface is a surface of a photosensitive material, and said drive current control circuit generates a current for compensating for variation of the intensity of the laser beam so that an effective spot size having a light intensity above a photosensitive level of said photosensitive material among laser beam spots formed on said surface of a photosensitive material does not change by a change in an incident angle of the laser beam with respect to a reflection surface of said rotary polyhedral mirror.

23. A laser beam scanner apparatus according to claim 12, wherein said drive current control circuit controls the drive current so that the laser beam spot size on the scanning surface is substantially constant during the scanning on the scanning surface independently of the change in incident angle of the laser beam with respect to said deflector for scanning of the scanning surface.

* * * * *